Jan. 7, 1941.   M. CARTER   2,227,631
HYDRAULIC CHANGE SPEED AND REVERSING GEAR
Filed Nov. 24, 1936   6 Sheets-Sheet 3

INVENTOR.
Maurice Carter
By Eugene E. Stevens
Atty.

Jan. 7, 1941.                    M. CARTER                    2,227,631
                HYDRAULIC CHANGE SPEED AND REVERSING GEAR
                    Filed Nov. 24, 1936        6 Sheets-Sheet 4

INVENTOR.
Maurice Carter
By Eugene E. Stevens
         Atty.

Jan. 7, 1941.                M. CARTER                 2,227,631
             HYDRAULIC CHANGE SPEED AND REVERSING GEAR
                    Filed Nov. 24, 1936        6 Sheets-Sheet 5

INVENTOR.
Maurice Carter
By Eugene E. Stevens
Atty.

Jan. 7, 1941.　　　　M. CARTER　　　　2,227,631
HYDRAULIC CHANGE SPEED AND REVERSING GEAR
Filed Nov. 24, 1936　　　6 Sheets-Sheet 6

INVENTOR.
Maurice Carter
By Eugene E. Stevens
Atty.

Patented Jan. 7, 1941

2,227,631

UNITED STATES PATENT OFFICE 2,227,631

HYDRAULIC CHANGE SPEED AND REVERSING GEAR

Maurice Carter, Bradford, England

Application November 24, 1936, Serial No. 112,569
In Great Britain December 3, 1935

4 Claims. (Cl. 60—53)

This invention relates to hydraulic change speed and reversing gear of the type consisting of a pump and motor each having pistons or vanes carried in radial cylinders or slots in the pump and motor bodies and in which the pump body is driven by the driving shaft, the motor body being carried in a non-rotatable manner by some fixed part of the gear case, and two eccentric rings or members which cause the pistons or vanes to reciprocate in their cylinders, or slots being connected to the driven shaft, means being provided for varying the strokes of the pistons or vanes of the pump and motor simultaneously.

The present invention has for its object to introduce an improved construction of gear of the above type in which fluid friction will be reduced to a minimum and which will combine mechanical strength, durability and low friction losses.

According to this invention the two eccentric members which cause the pistons or vanes of the pump and motor to reciprocate encircle the pump and motor discs, or bodies and are mounted in and rotated with a rotatable case which is carried independently of the driven shaft on bearings mounted in a fixed case or frame, a connection capable of transmitting torque being made between the rotatable case and the driven shaft, a single distributing valve controlling the flow of liquid to and from the motor and pump cylinders revolving inside the pump and motor bodies and being integral with or connected to the driven shaft. The distributing valve is made of small diameter with consequent low friction losses and it is formed with two sets of ports, one set of ports controlling the flow of working fluid to and from the pump cylinders and the other set of ports controlling the flow of working fluid to and from the motor cylinders. The two sets of ports are interconnected by passages within the valve.

Each set of ports may be formed by cutting two diametrically opposed ports in the circular section of the valve, leaving the dividing wall between the two ports in the form of an S section wall separating the other set of ports. This wall ensures ample passage area for the working fluid along with mechanical strength of the valve. The two eccentric rings which cause the pistons or vanes of the pump and motor to reciprocate, encircle the pump and motor discs, or bodies and are mounted in and rotated with a rotatable case which is carried independently of the driven shaft on bearings mounted in a fixed case or frame thereby relieving the bearings of the driven shaft of the loads due to the reactions of the pistons or vanes on the eccentric rings. The rotatable case is connected to the driven shaft by any convenient means capable of transmitting torque so that the rotatable case and the driven shaft revolve at the same speed. With a view to reducing the friction the pistons may be fitted at their outer extremities with slippers which bear directly on the inner races of ball or roller bearings which encircle the pump and motor discs or bodies and are carried in the eccentric rings. The latter may be connected together and may be pivotally mounted in the rotatable case and adjusted for eccentricity by a control member in such a manner that when the eccentricity of either ring is at zero, the eccentricity of the other ring has a magnitude hereinafter referred to as nominal maximum eccentricity used in gears not required to give overdrive or reverse. The driven shaft may be driven in a reverse direction by further adjustment of the eccentric rings beyond the zero position. It may also be driven at a speed that exceeds that of the driving shaft by further adjustment of the eccentric rings beyond the nominal maximum speed position. Adjustment of the two eccentric rings may be obtained by means of axial movement of a control sleeve slidably mounted in a fixed casing.

The invention also comprises the use of a ball bearing mounted in a sleeve slidably mounted in a fixed casing in the dual capacity of a journal bearing for the rotatable case and a thrust bearing for the control sleeve which ensures good support for the rotatable case, reduces the overall length of the gear and cheapens construction.

The invention further includes hydraulic change speed and reversing gear having the additional features described below and specified in the claims.

In the accompanying drawings—

In one form of construction for carrying the invention into effect and as illustrated in Figs. 1 to 5 and 12, 14 and 15 a driving shaft 1 is formed or provided at one end with a valve casing 2 to receive a portion of a distributing valve 3 which valve is formed with two sets of interconnected ports and forms part of or is fixed to the driven shaft 8. Extending around the valve casing 2 and fixed thereto or formed in a piece therewith is a disc 9 hereinafter referred to as the pump disc. This disc has a number of radial cylinder bores 10 which communicate with ports 11 in the valve casing 2 and such ports co-operate with one set of ports 4 and 5 in the distributing valve 3.

The other set of ports 6 and 7 in the valve 3 co-operates with ports 12 in a valve casing 13 that is formed in a stationary sleeve or bush 14 in which the driven shaft 8 is free to revolve. Attached to or forming part of this valve casing 13 is a disc 15 hereinafter referred to as the motor disc. This disc has a number of radial cylinder bores 16 which communicate with ports 12 in the valve casing 13.

Figure 14:
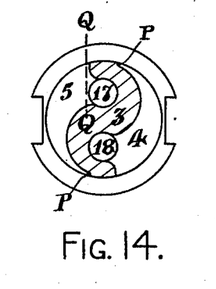
Fig. 14 is a cross section of the distributing valve taken on line 14—14 Fig. 12 and Fig. 13.
Figure 15:
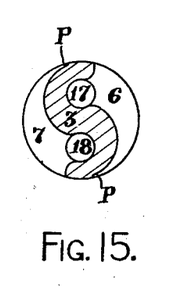
Fig. 15 is a cross section of the distributing valve taken on line 15—15 Fig. 12 and Fig. 13.

Each pair of ports 4, 5 and 6, 7 in the distributing valve 3 are separated by S section walls, Figs. 14 and 15 each wall serving to separate one port of a pair from the other and one S section wall being inversely arranged to the other.

Port 5 is connected to port 6 by a longitudinal passage 17 within the valve 3. Port 4 is connected to port 7 by a longitudinal passage 18 within the valve 3.

These sets of ports and passages 5, 17, 6 and 4, 18, 7 form the means by which the flow of the working fluid between the pump and motor cylinders is controlled. Referring to Fig. 14 and assuming that oil or other working fluid is being delivered by the pump through port 5 into passage 17, the cross sectional area of port 5 is gradually increased from point P to section QQ near passage 17, being everywhere approximately proportional to the volume of fluid passing the section in a given time thus giving an approximately constant velocity of flow of the liquid and leaving a maximum strength of valve section. This shape of port 5 along with a similar shape of port 4 leaves the metal of the valve 3 in the form of the S shaped wall previously referred to.

Each of the pump cylinders 10 is fitted with a piston 19 that is attached by a short connecting rod 20 and pin 21 to a curved slipper 22, the connecting rod being fixed to or part of the slipper. The outer surfaces of these slippers 22 engage the inner race 23 of a ball or roller bearing that encircles the pump disc 9. The slippers 22 are kept in position by retaining rings 24 which are positioned at opposite sides of the pump disc 9 by flanges on the slippers 22. The outer bearing race 25 is housed in a ring 26.

Each of the motor cylinders 16 is fitted with a piston 27 that is attached by a short connecting rod 28 and pin 29 to a curved slipper 30, the connecting rod being fixed to or part of the slipper.

The outer surfaces of these slippers 30 engage the inner race 31 of a ball or roller bearing that encircles the motor disc 15. The slippers 30 are kept in position by retaining rings 32 which are positioned at opposite sides of the motor disc 15 by flanges on the slippers 30. The outer bearing race 33 is housed in a ring 34.

The two rings 26 and 34 are rigidly fixed together in such a manner that they are eccentric to or out of line with one another. The rings so fixed are housed within a rotatable casing formed of three parts, the front cover 35 of the rotatable casing 36 and back cover 37 being secured by screws 38 Fig. 3 or other suitable means. The rings 26 and 34 are attached to the rotatable casing by a pin 39 which acts as a fulcrum on which the rings can be moved within the rotatable casing. These rings 26 and 34 are attached together by another pin 40 which acts as a means of adjusting their position. For this purpose pin 40 projects through an opening 41 in the front cover 35 of the rotatable casing 36 and is formed with two flats to engage a fork in an arm 42 that projects from a sleeve 43 that is slidably mounted on a tubular boss 44 formed on the front cover 35 of the rotatable casing 36. A portion of the arm 42 is formed with inclined surfaces 45 to engage correspondingly inclined surfaces 46 in the open ends of a ring 47 that is attached to the front cover 35 of the rotatable casing 36. When the sleeve 43 is moved in an endwise direction the inclined surfaces 45 and 46 impart a slight turning movement to the arm 42 relatively to the rotatable casing 35, 36, 37 and so adjust the eccentricities of the rings 26, 34 in relation to the axis of the driving shaft 1 and the driven shaft 8.

Fixed on the slidable sleeve 43 is the inner member of a ball race 48, the outer member of which 49 fits within a control sleeve 50 that is slidable in a tubular boss at one end of a stationary case 51 that encloses the rotatable case and other working parts. The sleeve 50 is attached to an inner sleeve 52 that is formed with rack teeth 53 to engage a pinion 54 that passes through a slot 55 in the control sleeve 50. The pinion 54 is secured to a shaft 56 which is carried in bearings in the stationary case 51. The pinion may be turned by a lever 57 secured to shaft 56, thus imparting an endwise movement to the sleeve 50. In place of the rack and pinion adjustment described any other means may be adopted for moving sleeve 50 in an axial direction.

The ball bearing 48, 49 acts in the dual capacity of a journal bearing for the rotatable case and a thrust bearing for the control sleeve and this feature ensures good support for the rotatable case, short overall length of the gear and cheapens construction.

The other end of the rotatable case 35, 36, 37 is supported by a ball bearing the outer race of which 58 is housed in the back cover 37, the inner race 59 being fixed on a stationary member 60 which comprises a flanged bush that is attached to a cover plate 61 that closes the end of the stationary casing 51. This stationary member 60 is keyed to the combined sleeve 14 and valve casing 13 that surrounds the driven shaft 8.

A connection is made between the rotatable case 35, 36, 37 and the driven shaft 8 so that the two revolve together. For this purpose the distributing valve 3 which is attached to or forms a part of the driven shaft 8 is formed with a portion of enlarged diameter 3A to which is keyed or otherwise secured a driving device 62 which may be formed with three arms two of which pass between the ball races 23, 25 and 31, 33 and act as balancing and spacing arms and the third acts as a driving arm by the engagement of a fork formed on it with flats formed on the pin 39 that connects the rings 26 and 34 with the rotatable case 35, 36, 37. This form of connection ensures that the loads on the rotatable case due to the reactions of the pump and motor are not transmitted to the valve 3.

One of the longitudinal passages 18 in the distributing valve 3 which constitutes the suction passage of the pump is extended along the driven shaft 8 and communicates with a lateral passage 63 formed therein. The passage 63 may be only open to one side of the driven shaft as shown in full lines Fig. 12 or may be open to both sides of the shaft as shown by dotted lines. This passage 63 leads to an annular space or chamber 64 formed in the stationary bush or sleeve 14 and working fluid is fed into this chamber to make up any loss from the system. For this purpose the chamber 64 is connected by a passage 65 and pipe 66 with a reservoir for the working fluid in the stationary casing 51.

The driving shaft 1 is supported in one bearing 67 mounted in the front cover of the rotatable casing 35 and another bearing 68 mounted in a cover 69 that is attached to the stationary casing 51. The stationary casing may be fitted with filler cap 70 and gauge 71 for checking the level of the working fluid. The cylindrical portion 36 of the rotatable casing is fitted with a balance weight 72 calculated or designed to balance about 80% of the out of balance force at top speed, the out of balance force at low speeds being negligible.

Figure 1:
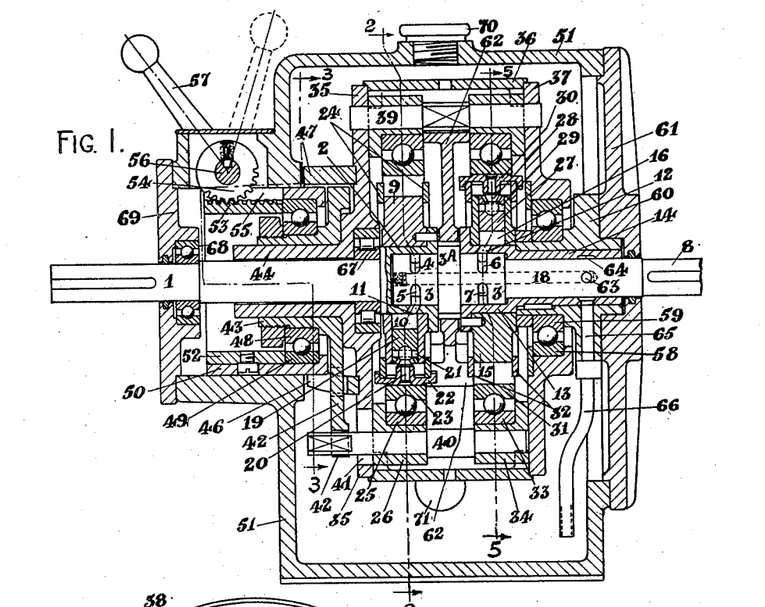
Fig. 1 is a sectional elevation of one form of gear employing piston type pump and motor in accordance with the invention. The section is taken on line 1—1 of Fig. 2.
Figure 2:
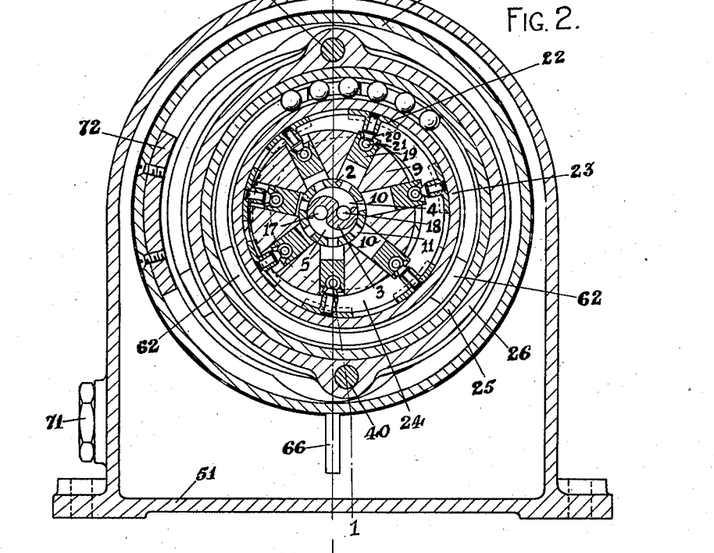
Fig. 2 is a sectional end elevation taken on line 2—2 of Fig. 1 looking in the direction of the arrow.
Figure 5:
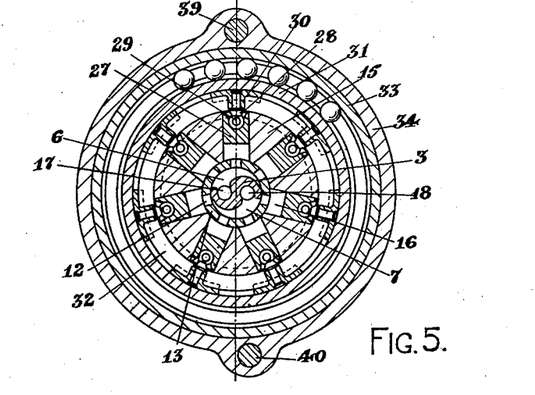
Fig. 5 is a sectional end elevation taken on line 5—5 of Fig. 1 looking in the direction of the arrow and in which all parts outside the eccentric ring are not shown.
Figure 6:
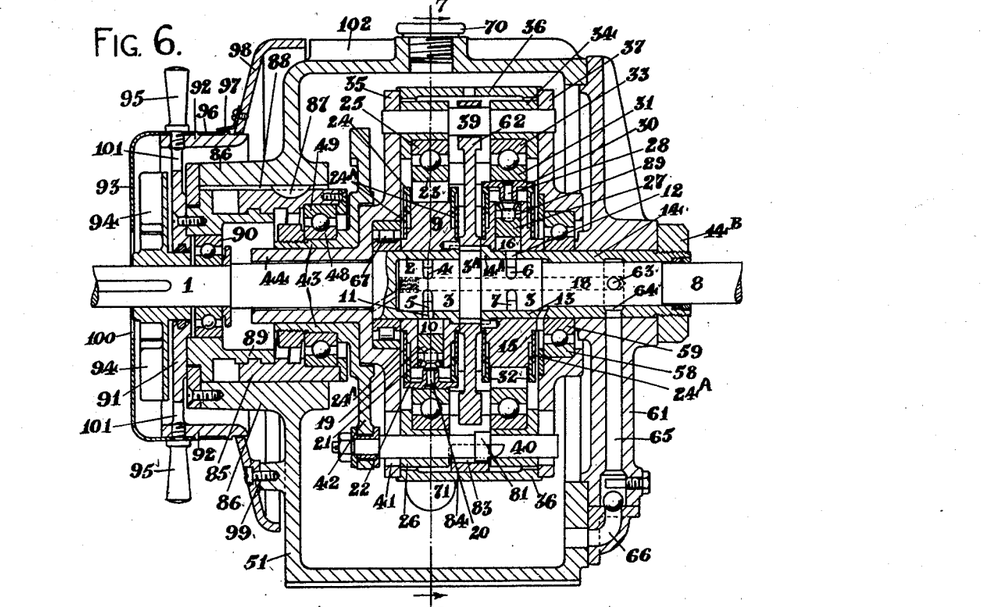
Fig. 6 is a sectional elevation of another form of gear employing piston type pump and motor in accordance with the invention. The section is taken on line 6—6 of Fig. 7.

Referring to Figures 1, 2 and 5, the two rings 26 and 34 are fixed together so that they are eccentric to or out of line with one another, and the radial distance from the axis of the gear to the center of gravity of these two rings together with the large ball bearings 23—25 and 31—33 is the arithmetic mean of the radial eccentricities of the two rings 26 and 34.

Referring to Figures 2 and 5 which show the gear in its maximum speed position, this center of gravity is situated to the right of the center line, and the radial distance from the axis of the gear to the center of gravity is half the radial eccentricity of ring 26.

When the gear is set so that the output speed is half the input speed, the center of gravity of the rings and ball bearings is on the axis of the gear, and when the gear is set for zero output speed, this center of gravity is situated to the left of the center line, its radial distance from the axis of the gear being the same as it is in the maximum speed position.

The out of balance centrifugal force on the two rings and ball bearings is proportional to the radial distance from the axis of the gear to their center of gravity multiplied by the output speed squared.

This out of balance force varies from a high value to the right at maximum speed dropping to zero at half speed, followed by low values to the left at lower speeds and reaching zero again at zero speed.

Figure 7:
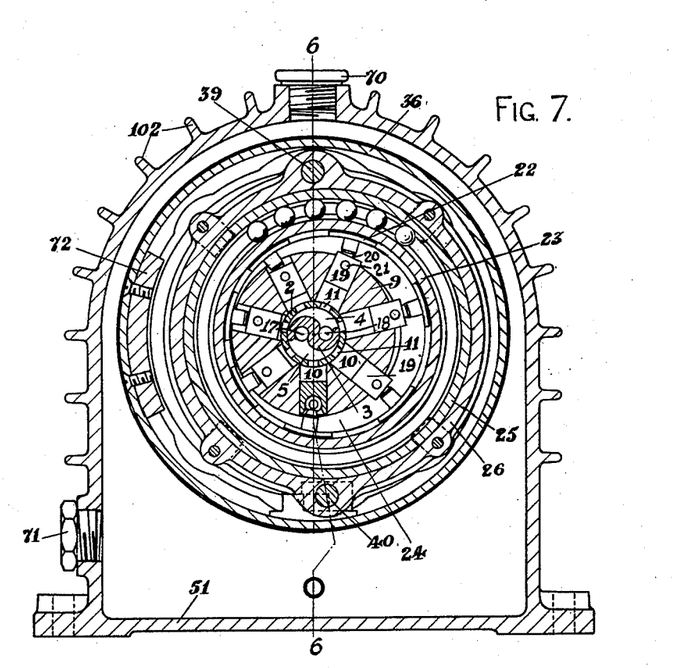
Fig. 7 is a sectional end elevation taken on line 7—7 of Fig. 6 looking in the direction of the arrows.
Figure 8:
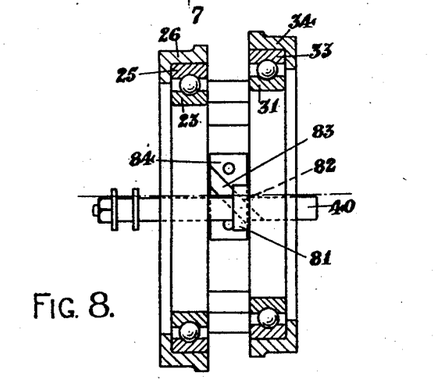
Fig. 8 is a sectional plan showing only the eccentric rings and bearings and part of the stroke control mechanism of the gear shown in Figs. 6 and 7.
Figure 9:
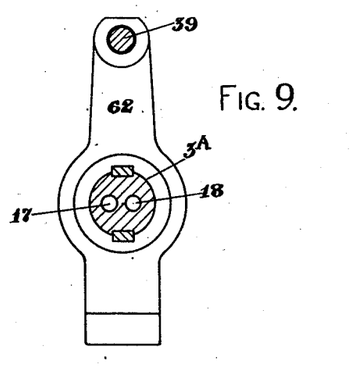
Fig. 9 is an end elevation of the driving arm of the gear shown in Figs. 6 and 7, the enlarged portion of the valve and the fulcrum pin being shown in section.

At maximum speed about 80% of this out of balance force is balanced, as by the fitting of a balance weight 72, Figs. 2 and 7, and by this means the resultant out of balance force is reduced to a value which is not detrimental over the full range of output speeds because although the centrifugal force on the balance weight acts in the same direction as the out of balance force at low speeds the magnitude of the forces is small because of the low speed.

To operate the gear the stationary casing 51 is supplied with a predetermined quantity of oil or other working fluid. The driving shaft 1 is rotated from any convenient source of power thus driving the pump disc 9. Assume the drive to be in a clockwise direction when viewing Figs. 2 to 5. If the ring 26 that encircles the pump disc 9 is set to its nominal maximum degree of eccentricity relatively to the driving shaft 1 as shown in Fig. 2, the other ring 34 that encircles the motor disc 15 will be concentric with that disc as shown in Fig. 5 and no motion of the motor pistons 27 in the cylinders 16 will take place as the ring 34 is carried round the fixed motor disc 15 by the rotatable case 35, 36, 37. Assuming that cylinders 10 and 16, ports 4, 5, 6 and 7 and passages 17 and 18 are all charged with working fluid, as the pump disc 9 revolves a pressure will be created in those cylinders 10 whose ports 11 are opposite port 5 in valve 3. This pressure will be communicated along passage 17 to port 6 but since no movement of pistons 27 takes place in cylinders 16 no fluid can pass from this port. Working fluid is therefore trapped in some of the cylinders 10 and a direct drive (less slip caused by leakage of the working fluid through the system) is transmitted by means of pistons 19 connecting rods 20, slippers 22 and bearing 23, 25 to the ring 26 that encircles the pump disc 9. Since the two rings 26 and 34 and the rotatable case 35, 36, 37 are all connected by pin 39 all these parts are driven in a clockwise direction. This drive is transmitted to the driven shaft 8 by means of pin 39 driving arm 62 and valve 3 to which the driving arm 62 is attached at 3A.

Figs. 1, 2, 3 and 5 all illustrate the gear in the control position described above which, neglecting slip, gives equal speeds of driving and driven shafts and there is no flow of working fluid.

Figures 3, 4:
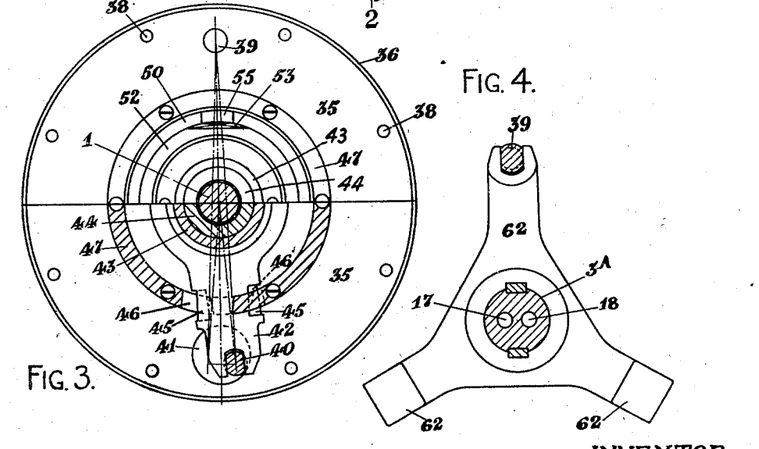
Fig. 3 is a sectional end elevation of the internal parts of the gear shown in Fig. 1 taken along line 3—3.
Fig. 4 is an end elevation of the driving arm of the gear shown in Figs. 1 and 2, the enlarged portion of the valve and the fulcrum pin being shown in section.

If the control sleeve 50 is moved axially to the left in Fig. 1 to its other nominal extreme position taking with it the ball bearing 48, 49 and the sleeve 43, the engagement of the inclined faces 45 and 46 on the arm 42 and the ring 47 respectively will cause the arm 42 to move through a small angle carrying pin 40 to the left hand side of the vertical centre line in Figs. 2, 3, and 5.

In this position of pin 40 the ring 26 that encircles the pump disc 9 is concentric with that disc and the ring 34 that encircles the motor disc 15 is set to its nominal maximum degree of eccentricity relatively to the driven shaft 8.

When driving shaft 1 is rotated there will be no movement of pistons 19 in cylinders 10 because ring 26 is concentric with pump disc 9 and no turning moment will be exerted on ring 26. Ring 26 and all parts connected to it, that is ring 34, rotatable case 35, 36, 37 driving arm 62, valve 3 and driven shaft 8 will therefore remain stationary. The control position just described therefore corresponds to zero speed of driven shaft or a gear ratio of infinity:1, and there is no flow of working fluid.

Adjustment of the control between the two nominal extreme positions mentioned above will give any desired ratio of driving speed to driven speed between 1:1 and infinity:1. In all intermediate positions of the control the centre of ring 26 will be on the right hand side of the vertical centre line in Figs. 2 and 3 and the centre of the ring 34 will be on the left hand side of the same centre lines and some working fluid will flow in a closed circuit between the pump cylinders 10 and the motor cylinders 16.

The driven shaft 8 may be caused to revolve in the reverse direction to that of the driving shaft 1 by moving the control beyond the setting required for zero speed of the driven shaft. In this position the ring 26 will have a slight eccentricity and the ring 34 a large eccentricity relative to the centre of the shafts 1 and 8 and the centres of both rings will be on the left hand side of the vertical centre line in Figs. 2 and 5.

The driven shaft 8 may be caused to revolve faster than the driving shaft 1 and in the same direction by moving the control beyond the setting required for the 1:1 ratio. In this position the ring 26 will have a large eccentricity and the ring 34 a small eccentricity relative to the centres of the shafts 1 and 8 and the centres of both rings will be on the right hand side of the vertical centre line in Figs. 2 and 5.

In another form of construction according to the invention and as illustrated by Figs. 6 to 9 and 12, 14 and 15 the retaining rings 24 and 32 are positioned at opposite sides of the pump disc 9 and motor disc 15 by discs 24A that are secured to the pump disc and the motor disc. The retaining rings 24 are free to move between the discs 24A and the pump disc and motor disc. The bush 14 is formed at one end with a flange 14A that engages in a recess formed in the motor disc 15 and the other end is threaded to take a nut 14B which is screwed on to the bush to clamp the motor disc 15 in a fixed position against rotation to the stationary case 51. The drive is transmitted to the driven shaft 8 by means of a pin 39 which engages in a hole in the driving arm 62. The hole is made slightly larger in diameter than that of the pin so that a driving contact is made but the loads due to the reactions of the pistons on the eccentric rings are not transmitted to the valve 3 or the driven shaft 8.

In the apparatus shown in Figs. 6 to 9 the pin 40 is formed with a collar 81 and such collar is formed with an inclined slot 82 that engages an inclined projection 83 on a block 84 that is fixed to the rotatable casing 36. The pin 40 projects through an opening 41 in the front cover 35 and is adapted to be moved endways by connection to the arm 42 that projects from the sleeve 43 that is slidably mounted on the tubular boss 44 formed on the front cover 35 of the rotatable casing 36. Fixed on the tubular member 43 is a ball bearing 48, and the outer member 49 is fixed in an internally threaded sleeve 85 that is slidably mounted in a boss 86 in the stationary case 51. The sleeve 85 is fitted with a key 87 that engages a keyway 88 in the boss 86. The internally threaded sleeve 85 engages a flanged externally threaded member 89 that is fitted with a ball bearing 90 which is fixed on the pump shaft 1. The screwed member 89 is fixed to the disc 91 that is formed with a cylindrical portion 92 which is fitted with a cover 93 which covers a fan 94 that is fixed on the shaft 1. The cover 93 is fixed to the cylindrical portion 92 by means of handles 95 which are screwed through the cover into the cylindrical portion 92. This casing is fitted with a graduated ring 96 for use with a pointer 97 that is fixed to a cover 98 that is attached by screws 99 to the stationary casing 51. To cool the apparatus the fan 94 draws air through a hole 100 in the cover 93 which passes through openings 101 in the disc 91 and passes around the boss 86 inside the cover 98 along the outer surface of the stationary case 51 and between fins or vanes 102. When the externally threaded member 89 is turned the sleeve 43 is moved in an endwise direction, the slot 82 travels along the inclined projection 83 and a turning movement is imparted to the arm 42 relatively to the rotatable casing 35, 36 and 37 and adjusts the eccentricities of the rings 26 and 34 in relation to the axis of the driving shaft 1 and the shaft 8.

Figure 10:
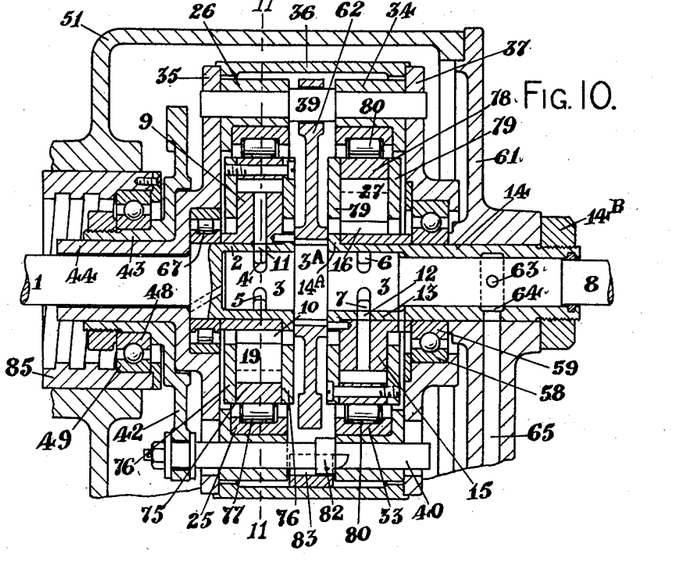
Fig. 10 is a sectional elevation taken on line 10—10 of Fig. 11 of one form of gear employing vane type pump and motor in accordance with the invention. Part of the stroke control mechanism is not shown.
Figure 11:
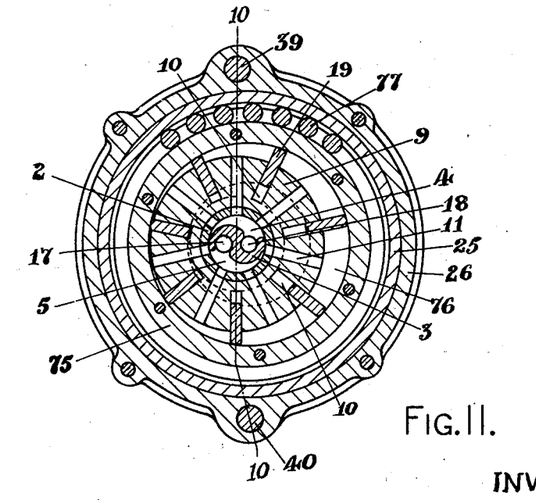
Fig. 11 is a sectional end elevation taken on line 11—11 of Fig. 10 in which all parts outside the eccentric ring are not shown.
Figure 12:
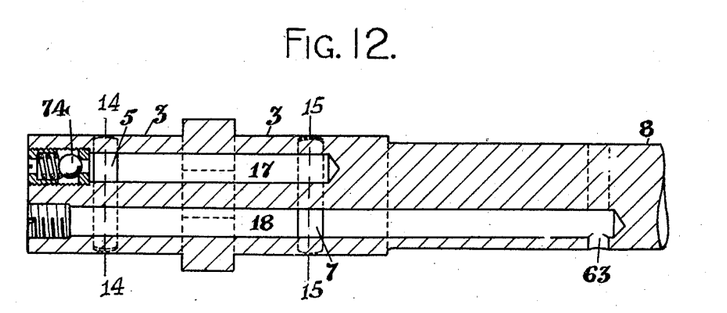
Fig. 12 is a longitudinal section of one form of distributing valve.

Referring to Figs. 10 and 11 which show a form of construction employing pump and motor of the vane type the form of control and general construction are the same as that illustrated in Figs. 6 to 9 and all parts common to both forms of construction are marked by the same reference numbers.

The pump disc 9 is formed with a number of radial slots 10 in which vanes 19 are free to slide. The outer case of the pump is formed of three parts, a body 75 and two covers 76 fastened together so that the pump disc 9 is free to slide between the covers 76.

The spaces between each adjacent pair of vanes 19 are bounded by the two covers 76, the pump disc 9 and the body of the outer case 75 and are connected to ports 11 in valve casing 2 by radial extensions of these ports through the pump disc 9.

The body of the outer case 75 is supported by rollers 77 which engage an outer race 25 in the ring 26.

The motor unit is constructed in a similar manner, the reference numbers being, motor disc 15, slots 16, vanes 27, body of outer case 78, flanges of the outer case 79, rollers 80, outer race 33 of the roller bearings, and ring 34.

Instead of rollers 77 and 80 bearing directly on the bodies 75 and 78 of the outer cases, complete ball or roller bearings may be used, the inner races being fixed to the bodies of the outer cases 75 and 78 and the outer races housed in the rings 26 and 34.

In another form of construction the pump unit may be of the piston type as shown in Figs. 1, 2, 5, 6 and 7 and the motor unit may be of the vane type as shown in Figs. 10 and 11, or alternatively, the pump unit may be of the vane type as shown in Figs. 10 and 11 and the motor unit may be of the piston type as shown in Figs. 1, 2, 5, 6 and 7.

In any form of construction the loss of working fluid from the system may be made up either by a small auxiliary pump driven from any rotating part of the gear, by gravity from an overhead supply or by suction of the gear itself from a reservoir formed in the stationary case.

The base of the stationary case 51 acts as a reservoir for the working fluid, the level of which is such that no rotating part of the gear is submerged, or alternatively the rotating parts may be partially or completely submerged in the working fluid. Any convenient means may be employed for cooling the latter and means may be provided for obtaining complete or partial running balance at all speeds.

Figure 13:
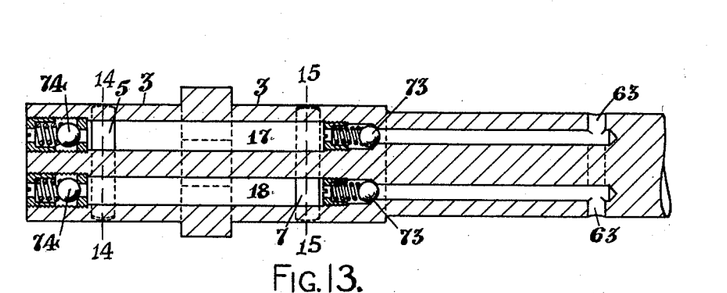
Fig. 13 is a longitudinal section of another form of distributing valve.

When the gear is to be used to give a reverse movement of the driven shaft 8 or when the gear is to be capable of being driven in either direction, either of the two passages 17 or 18 in the distributing valve 3 Fig. 13 may be the suction passage and in this case both of these passages 17 and 18 may be made to communicate with the port through which the replenishing fluid is fed by means of lateral passages 63 formed in the driven shaft 8. These lateral passages may be of the alternative forms shown in full and dotted lines in Fig. 13.

The passages 17 and 18 are fitted with non-return valves 73 so that the passage which contains working fluid under pressure is automatically isolated from the lateral passage 63.

Either one or both of the passages 17 and 18 in the distributing valve 3 may be fitted with relief valves 74 spring loaded to open at a pressure in excess of the normal working pressure to ensure that the working parts will not be damaged if the gear is overloaded.

The gear may be fitted with external reversing gear of any known type.

Packing rings may be fitted to prevent leakage between the distributing valve 3 and the valve casings 2 and 13.

The capacities of the pump and motor cylinders may be equal or unequal, the ratio of the capacities depending on the output torque required at various speeds.

What I claim as my invention and desire to secure by Letters Patent in the United States is:

1. Hydraulic variable transmission mechanism comprising in combination a driving shaft and a driven shaft, a pump body driven by the driving shaft, a single set of radially movable members slidably mounted in the pump body, a stationary outer casing enclosing all the working parts, a stationary motor body arranged in rigid connection with the stationary outer casing, a single set of radially movable members slidably mounted in the motor body, a single eccentric member for causing the radially movable members of the pump to reciprocate, a single eccentric member for controlling the reciprocation of the radially movable members of the motor, a rotatable case in which the eccentric members are pivoted, bearings supporting said rotatable case, a driving member for driving the driven shaft from the rotatable case, eccentric adjusting means, means for adjusting the eccentricities of the eccentric members simultaneously so that when either eccentric member is concentric with the axis of the driving and driven shafts the other eccentric member is in an eccentric position with respect to the axis of the shaft, a distributing valve in the driven shaft having four ports formed in it consisting of pump and motor inlet and outlet ports, the pump inlet port being connected with the motor discharge port and the pump discharge port being connected with the motor inlet port by passages within the valve, the motive fluid discharged by the pump actuating the radially movable members of the motor in accordance with the adjustment of the eccentrics, and a passage for the replenishing of the working fluid in communication with the pump inlet port of the distributing valve.

2. Hydraulic variable transmission mechanism according to claim 1 in which the rotatable case is formed at one end with a boss, an axially adjustable control sleeve slidably mounted on such boss and formed with a radial arm, a control pin operatively connected with the two pivoted eccentric members and with the radial arm, a member attached to the rotatable case having inclined surfaces, said radial arm having inclined surfaces which cooperate with the inclined surfaces on the member attached to the rotatable case to simultaneously adjust with respect to the shaft the eccentricities, and means for axially adjusting the control sleeve.

3. Hydraulic variable transmission mechanism according to claim 1 in which the rotatable case is formed at one end with a boss, an axially adjustable control sleeve slidably mounted on such boss and formed with a radial arm, a control pin attached to the radial arm and slidable in holes formed in the two pivoted eccentric members, a member attached to the rotatable case having inclined surfaces and a collar on the control pin having inclined surfaces which engage the inclined surfaces on the member that is attached to the rotatable case to simultaneously adjust with respect to the shaft the eccentricities, and means for axially adjusting the control sleeve.

4. Hydraulic variable transmission mechanism according to claim 1 in which the rotatable case is formed at one end with a tubular boss, an axially adjustable control sleeve slidably mounted thereon and formed with a radial arm, a control pin attached to the radial arm and slidable in holes formed in the two pivoted eccentric members, a member attached to the rotatable case having inclined surfaces and a collar on the control pin having inclined surfaces which engage the inclined faces on the member that is attached to the rotatable case to simultaneously adjust with respect to the shaft the eccentricities, a ball bearing comprising an inner race and an outer race and a ring of balls, the inner race being fixed on the axially adjustable control sleeve, an endwise movable sleeve fixed on the outer race of the said ball bearing which acts in the dual capacity of a journal bearing for the rotatable case and a thrust bearing for the axially adjustable control sleeve, and means connected with the endwise movable sleeve for axially adjusting the control sleeve.

MAURICE CARTER.